US011902852B2

(12) United States Patent
Dhaliwal et al.

(10) Patent No.: US 11,902,852 B2
(45) Date of Patent: Feb. 13, 2024

(54) ON-SITE APPOINTMENT ASSISTANT

(71) Applicant: Salesforce, Inc., San Francisco, CA (US)

(72) Inventors: Puneet Dhaliwal, Hayward, CA (US); Niv Garber, Petah Tikva (IL); D. Dustin Breese, San Francisco, CA (US); Prithvi Krishnan Padmanabhan, San Ramon, CA (US); Kara Carreri, Atlanta, GA (US); Rahul Mehta, San Francisco, CA (US); Raghav Abboy, San Francisco, CA (US); Yongbo Zuo, San Francisco, CA (US); Abraham Reyes, Atlanta, GA (US)

(73) Assignee: Salesforce, Inc., San Francisco, CA (US)

( * ) Notice: Subject to any disclaimer, the term of this patent is extended or adjusted under 35 U.S.C. 154(b) by 324 days.

(21) Appl. No.: 17/162,304

(22) Filed: Jan. 29, 2021

(65) Prior Publication Data

US 2022/0248165 A1 Aug. 4, 2022

(51) Int. Cl.
*H04W 4/021* (2018.01)
*H04W 4/029* (2018.01)
*G06Q 30/016* (2023.01)
*G06Q 10/0631* (2023.01)

(52) U.S. Cl.
CPC ...... *H04W 4/021* (2013.01); *G06Q 10/06311* (2013.01); *G06Q 30/016* (2013.01); *H04W 4/029* (2018.02)

(58) Field of Classification Search
CPC ............... H04W 4/021; H04W 4/029; G06Q 10/06311; G06Q 30/016
USPC ..................................................... 455/456.1
See application file for complete search history.

(56) References Cited

U.S. PATENT DOCUMENTS

| | | | |
|---|---|---|---|
| 10,585,657 B2 | 3/2020 | Padmanabhan | |
| 10,591,301 B2 | 3/2020 | Stewart et al. | |
| 10,705,928 B2 | 7/2020 | Mortimore, Jr. et al. | |
| 2011/0256881 A1* | 10/2011 | Huang | H04W 4/02 455/456.1 |
| 2015/0117631 A1* | 4/2015 | Tuchman | G06Q 30/0261 379/265.09 |
| 2015/0269531 A1* | 9/2015 | Menayas | G06F 3/0485 705/7.18 |
| 2016/0005077 A1* | 1/2016 | McDevitt | H04W 4/021 705/14.58 |
| 2016/0292738 A1* | 10/2016 | Porter | H04W 68/00 |
| 2018/0108023 A1 | 4/2018 | Stewart et al. | |
| 2019/0113345 A1 | 4/2019 | Stewart et al. | |

(Continued)

FOREIGN PATENT DOCUMENTS

WO 2019152750 A1 8/2019
WO 2019190855 A1 10/2019

(Continued)

*Primary Examiner* — William Nealon
(74) *Attorney, Agent, or Firm* — Polygon IP, LLP

(57) ABSTRACT

Described herein are systems, apparatus, methods and computer program products configured to provide tracking and/or status updates for on-site service personnel. Geofences may be utilized to provide for automated updates to a customer. Additionally, tracking links and other communications may be provided to the customer to allow for improved communications with on-site service personnel.

20 Claims, 13 Drawing Sheets

(56) References Cited

U.S. PATENT DOCUMENTS

| | | | |
|---|---|---|---|
| 2019/0236598 A1 | 8/2019 | Padmanabhan | |
| 2019/0236606 A1 | 8/2019 | Padmanabhan et al. | |
| 2019/0303445 A1 | 10/2019 | Padmanabhan | |
| 2019/0377806 A1 | 12/2019 | Padmanabhan et al. | |
| 2020/0042939 A1 | 2/2020 | Padmanabhan | |
| 2020/0089663 A1 | 3/2020 | Padmanabhan | |
| 2020/0089670 A1 | 3/2020 | Padmanabhan et al. | |
| 2020/0089671 A1 | 3/2020 | Padmanabhan et al. | |
| 2020/0089672 A1 | 3/2020 | Velisetti et al. | |
| 2020/0099685 A1 | 3/2020 | Wijaya et al. | |
| 2020/0134529 A1 | 4/2020 | Dhaliwal et al. | |
| 2020/0260217 A1* | 8/2020 | Choi | H04W 4/023 |
| 2020/0349142 A1 | 11/2020 | Padmanabhan | |
| 2020/0349564 A1 | 11/2020 | Padmanabhan et al. | |
| 2021/0352432 A1* | 11/2021 | Watson | H04W 12/64 |
| 2022/0237543 A1* | 7/2022 | Bjelcevic | G06Q 10/06311 |

FOREIGN PATENT DOCUMENTS

| | | |
|---|---|---|
| WO | 2020061224 A1 | 3/2020 |
| WO | 2020061225 A1 | 3/2020 |
| WO | 2020061226 A1 | 3/2020 |
| WO | 2020160109 A1 | 8/2020 |

\* cited by examiner

ON-SITE APPOINTMENT ASSISTANT

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to flexible displays and more specifically to providing updates and coordinating on-site personnel.

BACKGROUND

Providing quality on-site support has become more valuable in recent times. This is especially true as businesses have virtualized and traditional storefronts where customers would obtain support have been moved online. Meanwhile, the on-site support experience may suffer from a dearth of information available to the customer. The dearth of information may result in the customer feeling left in the dark and frustrated, hindering the customer experience.

BRIEF DESCRIPTION OF THE DRAWINGS

The included drawings are for illustrative purposes and serve only to provide examples of possible structures and operations for the disclosed inventive systems, apparatus, methods and computer program products for on-site support appointment aides. These drawings in no way limit any changes in form and detail that may be made by one skilled in the art without departing from the spirit and scope of the disclosed implementations.

DETAILED DESCRIPTION

Some embodiments of the disclosed systems, apparatus, methods and computer program products are configured for providing tracking and/or status updates for on-site support (e.g., service) personnel. In various embodiments, various geofences may be utilized to provide for automated updates to a customer. Additionally, tracking links and other communications may be provided to the customer to allow for improved communications with on-site service personnel.

Specifically, the disclosed systems and techniques allow for automatic updates to be provided to a customer based on the location of the on-site technician relative to various geofences. The dimensions and configurations of the geofences may be pre-determined or configured accordingly. The geofences and/or various tracking links may be set up or torn down based on the determined location of the on-site technician. Such a configuration allows for more efficient use of processing resources as geofences may be configured and only temporarily stored.

Figure 1:
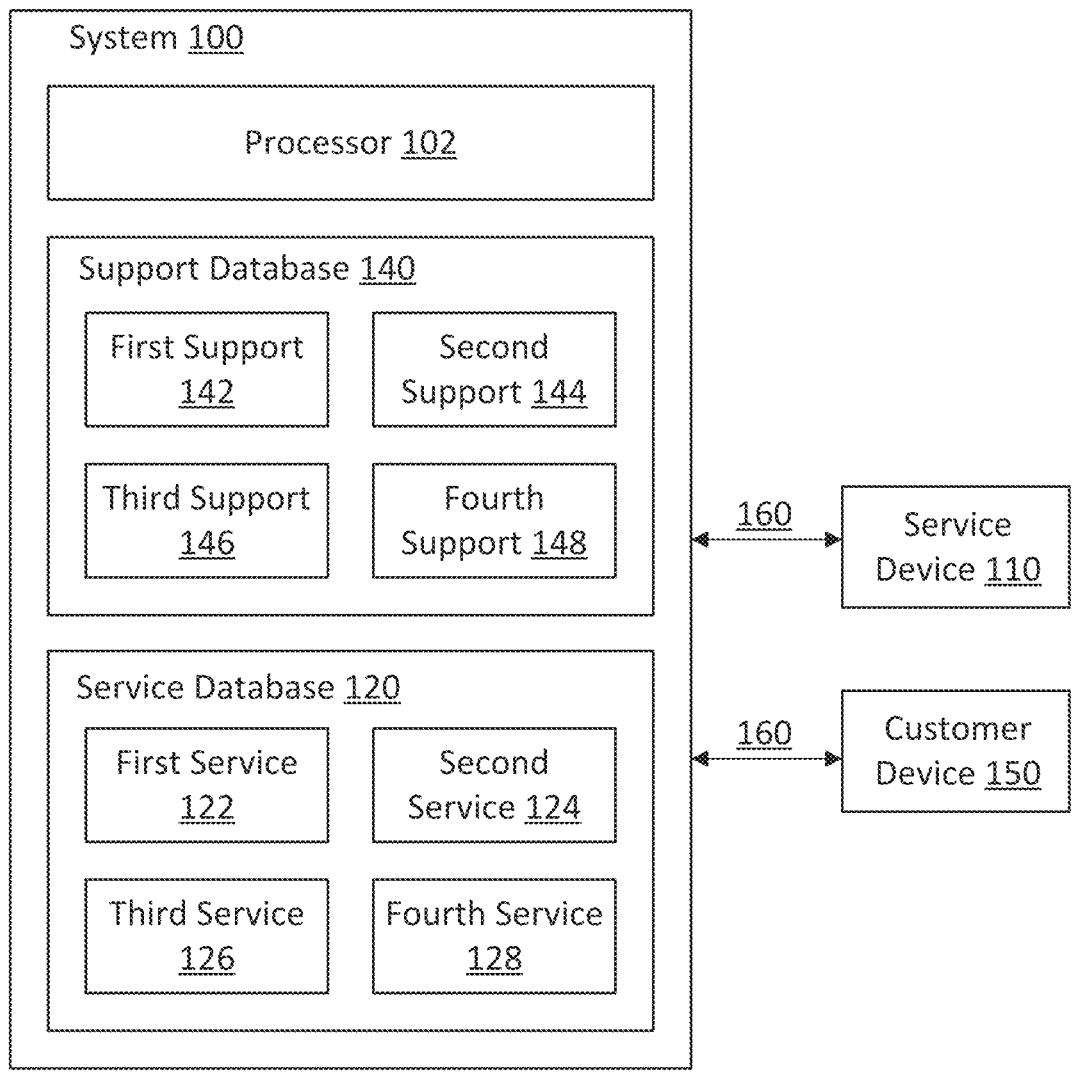
FIG. 1 illustrates a block diagram of an example system, configured in accordance with one or more embodiments.

FIG. 1 illustrates a block diagram of an example system, configured in accordance with one or more embodiments. FIG. 1 illustrates system 100 communicatively coupled to service device 110 and user device 150 via communications channel 160. As described herein, "communicatively coupled" refers to when devices are able to provide and/or exchange with one another (e.g., exchange data that includes information, commands, and/or other data) through one or more communications techniques. Such communications techniques may include, for example, wired or wireless communications techniques such as wired networks (e.g., Ethernet for accessing the internet), 4G, 5G, short message service (SMS), satellite communications, Bluetooth®, NFC, and/or other communications techniques. Communications channel 160 may include channels utilizing one or more of such communications techniques.

Service device 110 may be a device associated with an on-site support technician. Customer device 150 may be a device associated with a customer. Service device 110 and customer device 150 may be one or more electronic devices such as desktops, laptops, tablets, smartphones, wearable devices, and/or other such electronic devices. Service device 110 and/or customer device 150 may each include one or more processors, memory (e.g., for storing one or more applications), communications components, location devices (e.g., a GPS device or one or more accelerometers), and/or other such components. In various embodiments, service device 110 and/or customer device 150 may be configured to perform one or more actions as described herein.

System 100 may be communicatively coupled to service device 110 and/or customer device 150 via communications channel 160. System 100 may include processor 102, service database 120, and support database 140. Processor 102 may be configured to receive data (e.g., from a non-transitory memory, from service device 110, and/or customer device 150) and/or provide instructions or data to one or more components or devices to perform the techniques described herein.

System 100 may include one or more databases. One or more memories (e.g., transitory or non-transitory) may be included in such databases. The memory may be a harddrive (e.g., disc drive or solid state drive), other memory storage device, and/or another component configured to store instructions and/or data. Service database 120 and support database 140 may be stored within the memory.

Support database 140 may be a database associated with various service providers. Thus, for example, support database 140 may store the configurations of various different service providers. Such a configuration may allow for support database 140 to provide on-site support updates, tracking, and/or other data for a plurality of service providers without sensitive data associated with each service provider from being accidentally mixed with other service providers. Such configurations may include configurations for providing updates and data when and/or after on-site service personnel is dispatched. Such updates and data may be provided based on the determined location of on-site service personnel relative to the customer and/or to one or more geofences.

Support database 140 may separately store the configurations for different service providers. Thus, support database 140 may be configured to separately store configurations in first support database 142, second support database 144, third support database 146, and fourth support database 148, which may be associated with a first service provider, a second service provider, a third service provider, and a fourth service provider, respectively. Each of first support database 142, second support database 144, third support database 146, and fourth support database 148 may include geofences and other configurations associated with the respective service provider. As such, the different service providers may include different geofences and other configurations stored within the respective databases of the service provider. For example, each of the different service providers may separately configure their geofences based on, for example, a specified radius for each of the geofences, setting the geofences based on estimated time to travel (e.g., based on one or more mapping applications, the estimated time to travel from various points may be determined and one or more geofences may be configured around such estimated travel time areas), and/or another technique. Such a support database 140 setup allows for efficient storage of different configurations for each separate service provider.

Service database 120 may be a database associated with various on-site service personnel. In certain embodiments, each on-site service personnel may include separate preferences (e.g., privacy or tracking preferences) and may, thus, include data stored in separate databases. As such, service database 120 may include first service database 122, second service database 124, third service database 126, and fourth service database 128, each associated with a first on-site service personnel, a second on-site service personnel, a third on-site service personnel, and a fourth on-site service personnel, respectively. Each of first service database 122, second service database 124, third service database 126, and fourth service database 128 may, thus, include settings such as the radius of tracking for the on-site service personnel, when updates are provided based on movement of the on-site service personnel, and/or other such settings as described herein. Based on the data of support database 120 and/or support database 140, data may be received from and/or provided to service device 110 and/or customer device 150.

Figure 2:
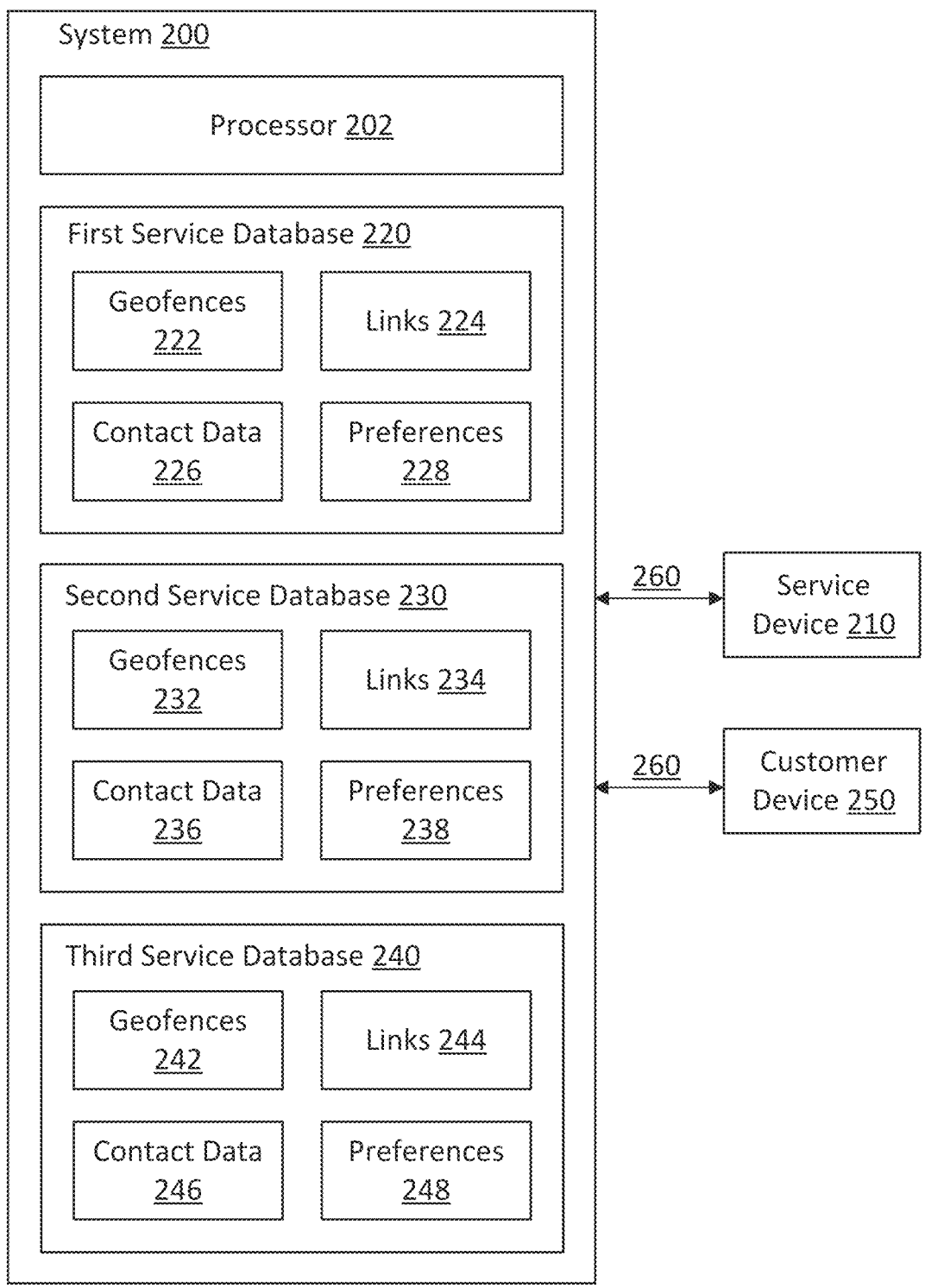
FIG. 2 illustrates a block diagram of another example system, configured in accordance with one or more embodiments.

FIG. 2 illustrates a block diagram of another example system, configured in accordance with one or more embodiments. FIG. 2 illustrates system 200 communicatively coupled to service device 210 and user device 250 via communications channel 260. Service device 210 and user device 250 may be similar to service device 110 and user device 150, respectively. Communications channel 260 may be similar to communications channel 160.

System 200 may be configured to provide updates, tracking, and/or other data associated with on-site support personnel, according to the techniques described herein. In various embodiments, systems 100 and/or 200 may be referred to herein as a "server device." System 200, may include first service database 220, second service database 230, and third service database 240. Each of first service database 220, second service database 230, and third service database 240 may be associated with various service providers (e.g., different service providers). Each of first service database 220, second service database 230, and third service database 240 may include geofences 222/232/242, links 224/234/244, contact data 226/236/246, and preferences 228/238/248, respectively. Such a configuration may allow for system 200 to provide on-site support updates, tracking, and/or other data for a plurality of service providers without sensitive data associated with each service provider from being accidentally mixed with other service providers. Furthermore, the configuration of FIG. 2 allows for a single on-site support personnel to provide services to a plurality of service providers (e.g., on a contracting basis) while being able seamlessly transition between the different service providers.

Geofences 222/232/242 may store one or more geofences or geofence configurations. Thus, for example, data directed to how geofences are set up relative to the position of the on-site support personnel and/or the customer may be included. Such data may, for example, specify the dimensions of the geofence, the identity of the geofence (e.g., which geofence in a technique that requires a plurality of geofences), and/or other such data. In the configuration as shown, as each of geofences 222/232/242 is associated with different service providers, geofences 222/232/242 may be separately configured based on, for example, a specified radius, an estimated time to travel, and/or another technique, for each service provider.

Links 224/234/244 may store data directed to one or more links that may be provided to the customer. Such links may be, for example, links for tracking the location of an on-site service personnel. Links 224/234/244 may provide such tracking to, for example, customer device 250. The tracking link may be configured, when utilized by a customer, to allow the customer to determine a current or near-current location of the on-site support personnel. In certain embodiments, data within links 224/234/244 may be updated. Thus, for example, certain links may be created and/or expired based on the location of on-site support personnel relative to one of more geofences. Additionally or alternatively, the links 224/234/244 may be a link to allow for communication between service device 210 and customer device 250. In various embodiments, links 224/234/244 may include encrypted data that may be decrypted by the system 200 to determine or allow for a determination of a current location of an on-site support personnel. Each of the service providers may configure the information that is presented to a customer (e.g., based on the tracking). As such, the amount of information provided to the customer when interfacing with links 224/234/244, such as whether tracking information is included and the amount of tracking information included (e.g., the precision of tracking, whether an estimated time of arrival is provided, whether information related to the current movement of the on-site support personnel, such as movement direction and/or speed, is provided, and/or other such aspects) may be configured according to the service provider.

Contact data 226/236/246 may include data directed to techniques for contacting one or more on-site support personnel. As such, for example, contact data 226/236/246 may include data for contacting service device 210. In certain embodiments, such contact techniques may cause service device 210 to provide data (e.g., location data, movement data, calendar data, and/or other such data) to system 200. Providing such data may be through an automatic technique (e.g., communications between service device 210 and system 200 may be performed without input from the on-site support personnel) or through a manual technique (e.g., the on-site support personnel may interact with service device 210 to provide such data). Furthermore, contact data 226/236/246 may be utilized to allow for customer device 250 to contact service device 210 (e.g., via system 200).

Preferences 228/238/248 may include preferences of the service provider or of individual on-site service personnel. For example, such preferences may include the settings of geofences (e.g., the dimensions of geofences and the relationship of geofences to the positions of various parties). In certain embodiments, preferences 228/238/248 may include privacy preferences of the individual on-site service personnel. Such privacy settings may, for example, affect how tracking is performed on the on-site service personnel and/or how data associated with the on-site service personnel is provided.

Figure 3:
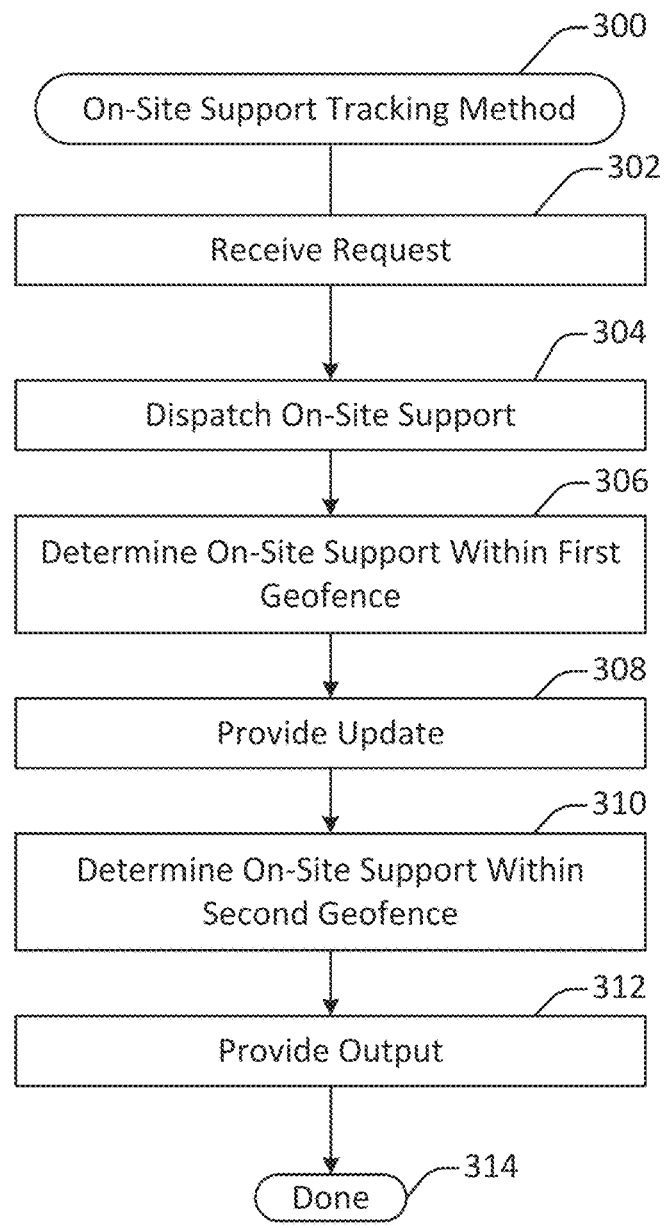
FIG. 3 illustrates an example technique of providing on-site support tracking, performed in accordance with one or more embodiments.

FIG. 3 illustrates an example technique of providing on-site support tracking, performed in accordance with one or more embodiments. FIG. 3 illustrates on-site support tracking method 300.

In 302, a request is received. The request may be, for example, a request to dispatch on-site support personnel for a customer. The request may be provided from a customer device. The request may be provided from, for example, an application of the customer device, a message drafted and transmitted by the customer, and/or through another technique.

In 304, in response to the request of 302, on-site support personnel may be dispatched. On-site support personnel may, thus, begin traveling to a specified location of the customer (e.g., the customer's house, office, and/or another location). In response to the dispatching of on-site support personnel, one or more geofences may be configured. Such geofences may be configured around the specified location of the customer, the location of the on-site support personnel, another one or more locations specified by the service provider, on-site support personnel, and/or another party. The dimensions and/or shape of the geofence may be preset or may be determined based on the preferences of the customer, service provider, the on-site support personnel, the nature of the support call, and/or other factors.

As the on-site support personnel is dispatched, location data may be received from the service device of the on-site service personnel. Based on the location data, the location of the current location of the on-site support personnel may be determined. The current location of the on-site support personnel may be compared to that of the geofences. In 306, a determination is made that the on-site support personnel is located within a first geofence.

The first geofence may be a geofence configured to trigger a status update of the on-site support personnel. The first geofence may be located away from the specified location of the customer to allow for a status update of the on-site support personnel before the on-site support personnel arrives at the specified location. In response to determining that the on-site support personnel is located within the first geofence (e.g., has entered the first geofence), an update may be provided (e.g., communicated via the techniques described herein) to the customer device.

The update may include, providing an estimated time of arrival of the on-site support personnel, a link to track the location of the on-site support personnel, a status update (e.g., "dispatched," "en route," "almost there," and/or another such status), and/or another update that provides information to the customer. The update may also include information associated with the identity of the on-site support personnel (e.g., a name, ID number, a photo, and/or other such data) as well as other information useful to the customer.

In 310, a determination may be made that on-site support personnel is located within a second geofence. The second geofence may be a geofence separate from the first geofence. Thus, in various embodiments, the second geofence may be, for example, contained within the first geofence. The second geofence may be associated with an area where the on-site support personnel is determined to be close to the specified location. Thus, the second geofence may trigger additional actions by the server device. As such, initial information may be provided to the customer when the on-site support personnel enters the first geofence and additional information may be provided when the on-site support personnel enters the second geofence. In various embodiments, one or more geofences may be utilized as appropriate. The geofences may allow for automatic updates to be provided to the customer, increasing convenience for the on-site support personnel. While the example of FIG. 3 illustrates a technique utilizing two geofences, other embodiments may include any number of geofences.

As such, in 312, an output may be provided in response to determining, in 310, that the on-site support personnel is within the second geofence. Such an output may include, for example, an indication that the on-site support personnel is arriving soon, a link to track the location of the on-site support personnel, a status update (e.g., "arriving soon," "arrival within 5 minutes," "has arrived," and/or another such status), and/or another update that provides further information to the customer. The update may also include additional information, such as identity information or other information useful to the customer. Based on such an output, the customer may receive additional data to be prepared for arrival of the on-site support personnel.

Figure 4:
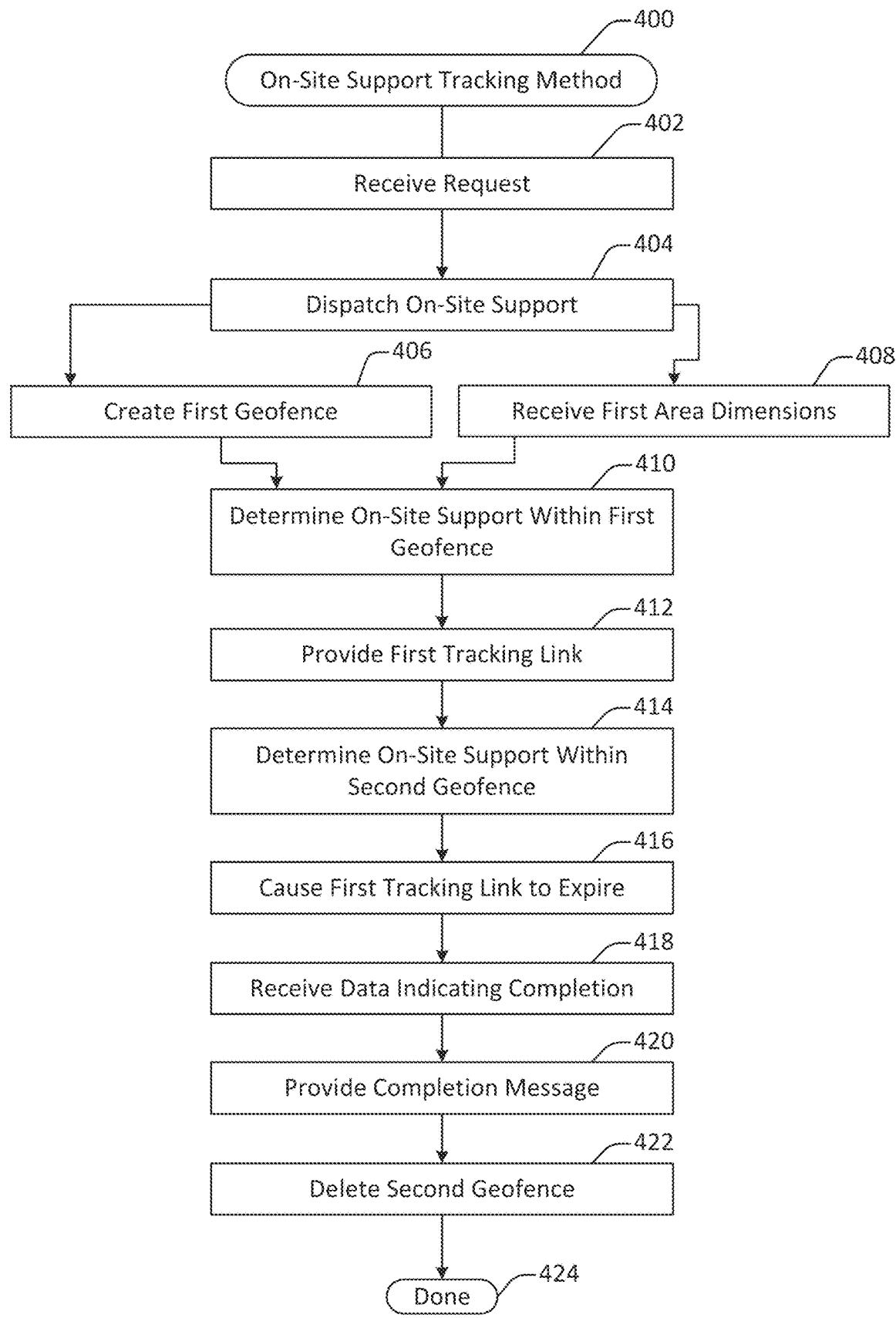
FIG. 4 illustrates another example technique of providing on-site support tracking, performed in accordance with one or more embodiments.

FIG. 4 illustrates another example technique of providing on-site support tracking, performed in accordance with one or more embodiments. FIG. 4 illustrates on-site support tracking method 400. Portions of on-site support tracking method 400 may be similar to that of on-site support tracking method 300.

In 402, a request is received. Such a request may be similar to the request received in 302. In 404, similar to 304, on-site support personnel may be dispatched in response to the request of 402.

Before, during, or in response to dispatching of on-site support personnel, one or more geofences may be configured in 406. Such geofences my include a first geofence, as well as additional geofences (e.g., a second geofence, a third geofence, and other geofences). The geofences may be configured according to the preferences and settings of the service provider, the customer, the on-site support personnel, and/or based on other settings.

For example, the service provider may specify the locations around which geofences should be erected (e.g., around the specified location of the customer, around a city limit, around a distance where the on-site support personnel is determined to be a certain time away, such as 20 minutes, and/or located through another technique). The service provider may also specify the dimensions (e.g., shape and/or size) of the geofences as well as the actions resulting from entry into and/or exit from the geofences.

Furthermore, before, during, or in response to dispatching of on-site support personnel, first area dimensions may be determined in 408. The first area may be associated with tracking the location of the on-site support personnel. The first area may be an area where the on-site support personnel would be located within when the customer is tracking the location of the on-site support personnel. Thus, in various embodiments, the precise location of the on-site support personnel may be hidden from the customer, to increase the security, safety, and/or privacy of the on-site support personnel. The first area may be randomized around the location of the on-site support personnel to avoid having the on-site support personnel be directly located within the center of the first area. The precise location of the on-site support personnel is thus hidden to be somewhere within the first area.

As in method 300, in on-site support tracking method 400, the current location of the on-site support personnel may be tracked (e.g., the server device may receive location data from the service device). In 410, the service device may be determined to have entered a first geofence. 410 may be similar to 306.

In response to determining that the service device has entered the first geofence, a first tracking link may be provided to the customer device in 412. The tracking link may be provided through an application, through a SMS message, through an e-mail, and/or through another appropriate technique. The first tracking link may allow for data to be communicated to a customer device that indicates a location or approximate location of the on-site support personnel. For example, the first tracking link may allow the customer to access a page that indicates that the location of the on-site support personnel is within the first area.

In 414, location data may indicate that the on-site support personnel is within the second geofence. The second geofence may be, for example, a geofence located within the first geofence and may indicate an area where, if the on-site support personnel is located within the area, the on-site support personnel may soon (e.g., within five minutes or one minute) arrive at the specified location.

In response to determining that the on-site support personnel is within the second geofence, the tracking link may expire in 416. In some embodiments, as the second geofence may indicate a location close to the specified location and may be associated with imminent arrival of the on-site support personnel, tracking of the on-site support personnel may no longer be necessary once the on-site support personnel is determined to be within the second geofence. As such, tracking of the on-site support personnel may cease in response to determining that the on-site support personnel is within the second geofence. As the server device provides tracking of the on-site support personnel, expiration of the tracking link may result in conservation of the resources of the server device, as the server device will no longer need to provide or perform tracking of the service device.

After the on-site support personnel is within the second geofence, the on-site support personnel may arrive at the specified location. The on-site support task may then be performed. Such a support task may include, for example, maintenance, tech support, installation, troubleshooting, and/or another such task, as appropriate. Upon completion of the on-site support task, data may be communicated to the server device to indicate completion of the task. In various embodiments, such data may be provided by the on-site support personnel (e.g., from the service device) and/or from the customer (e.g., from the customer device).

After the on-site support task has been finished, data may be received indicating that the on-site support task has been completed, in 418. Thus, for example, the on-site support personnel may provide an indication on the service device once the on-site support task is finished. Additionally or alternatively, the customer may provide such an indication. In certain embodiments, an additional geofence may be configured. When the on-site support personnel exits the additional geofence after arriving at the specified area, the server device may automatically determine that the on-site support task has been performed.

Once the on-site support task has been performed, a task completion message may be provided to the customer device in 420 to inform and/or confirm with the customer that the on-site support task has been completed. In certain embodiments, the completion message may request or allow the customer to confirm that the on-site support task has been performed and may allow for the customer to provide feedback on the performance of the on-site support.

Furthermore, upon determining that the on-site support task has been performed, the second geofence, as well as other additional geofences, may also be deleted. Memory may, thus, be saved as the geofences configured for the on-site support tasks may not need to be stored.

Figure 5:
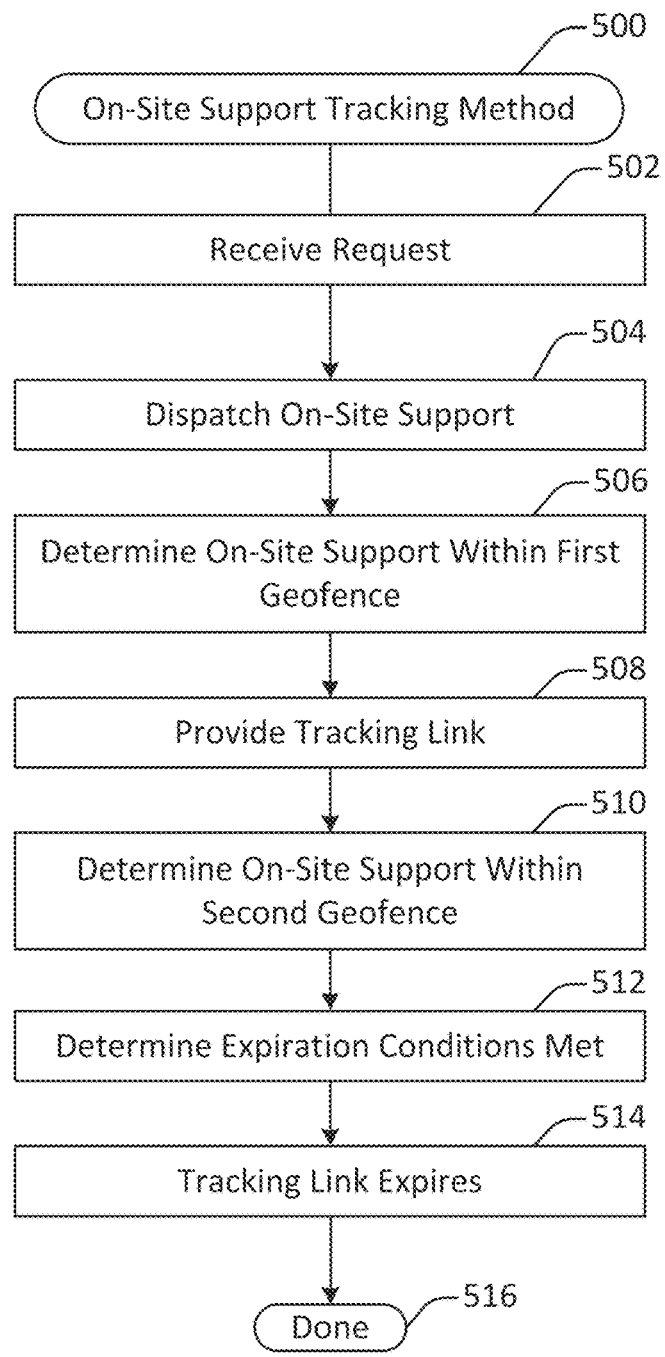
FIG. 5 illustrates a further example technique of providing on-site support tracking, performed in accordance with one or more embodiments.

FIG. 5 illustrates a further example technique of providing on-site support tracking, performed in accordance with one or more embodiments. FIG. 5 illustrates on-site support tracking method 500. Portions of on-site support tracking method 500 may be similar to that of on-site support tracking methods 300 and/or 400.

In 502, a request is received and on-site support personnel is dispatched in 504 in response to the request. 502 and 504 may be performed similar to 302/402 and 304/404, respectively.

Before, during, or in response to dispatching of on-site support personnel, one or more geofences may be configured, as described herein. In 506, a determination is made from the location data of the service device that the service device is within a first geofence. 506 may be similar to that of 306/410. In 508, a tracking link may be provided based on the determination that the on-site support personnel has entered the first geofence. 508 may be similar to 412.

In 510, similar to 414, a determination may be made from location data of the service device that the service device is within a second geofence. In response to such a determination, a determination may be made as to whether expiration conditions for the tracking link have been met, in 512.

Such expiration conditions may include one or more of, for example, determining that a threshold period of time has passed since communication of the tracking link in 508, that the on-site support personnel is within the second geofence, that the on-site support personnel is within a threshold distance of the specified location, that an indication is received that the on-site support personnel has arrived at the specified location, that work has begun for the on-site support task, and/or another such condition.

In various embodiments, a combination of conditions may need to be met. Thus, for example, the expiration condition may be that the on-site support personnel is determined to be within the second geofence and that the tracking link has been provided for longer than a threshold period of time. In such an embodiment, both conditions need to be met before the expiration conditions are determined to have been met. In other embodiments, only one of a plurality of conditions needs to be met in order for the expiration conditions to be satisfied, or a combination thereof of a plurality of conditions needs to be met. Based on the determination that the expiration conditions have been met in 512, the tracking link may then expire in 514. Data associated with the tracking link may then be deleted from the server device.

Figure 6:
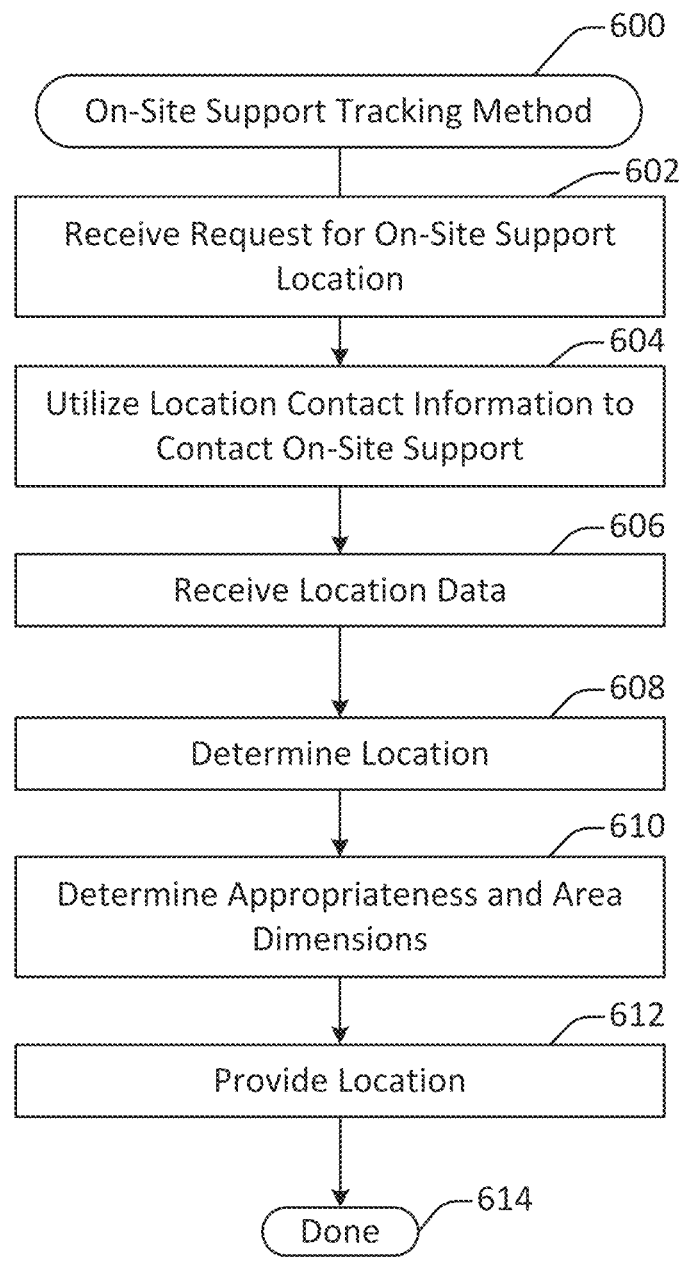
FIG. 6 illustrates an additional example technique of providing on-site support tracking, performed in accordance with one or more embodiments.

FIG. 6 illustrates an additional example technique of providing on-site support tracking, performed in accordance with one or more embodiments. FIG. 6 illustrates on-site support tracking method 600. On-site support tracking method 600 may be a technique for determining a location of on-site support personnel, utilized in the techniques described herein.

In 602, the server device receives a request for the location of the on-site support personnel. In various embodiments, an application of the server device may provide a request for the current location of the service device. Such a request may be based on time and/or may be based upon a request from a customer.

Databases within the server device may store location contact information associated with the service device. The location contact information may include a phone number or other identifying number where data or requests may be communicated to the service device. The location contact information may be utilized to contact the service device in 604. Thus, the server device may transmit data to an application of the service device via the location contact information. The data may request data indicating the current location of the service data. In certain other embodiments, the location contact information may be utilized to allow for a customer device to contact the service device, via the server device.

In response, in 606, the service device provides location data, which is received by the server device. The location data may include, for example, GPS data, accelerometer data, cellular signal data, gyroscope data, and/or other such data that may be used to determine a location of the on-site support personnel.

The server device may then determine the location of the service device from the location data, in 608. For example, GPS data may indicate a global position of the service device. Accelerometer and/or gyroscope data may allow for a determination of how the service device has moved since the last determined position (which may be stored by the server device). Cellular signal data may allow for triangulation between cellular towers to determine the position of the service device relative to the cellular towers. As such, the position of the service device may be determined accordingly.

After the location of the service device has been determined in 608, the appropriateness of providing the location of the service device may be determined in 610. Appropriateness includes, for example, a determination of whether the location of the service device should be provided to the customer. For example, in certain embodiments, the location of the service device may only be provided to the customer if the service device is determined to be within one or more specific geofences. In such embodiments, an appropriate determination of whether the service device is located within the appropriate geofences may accordingly be performed. Furthermore, privacy settings of the on-site support personnel may also be checked to determine appropriateness (e.g., certain on-site support personnel may include settings that prevent tracking of the location of the on-site support personnel).

Additionally, if providing the location of the on-site support personnel is appropriate, the area dimensions may be determined in 610. As described herein, the area dimensions may obscure the precise location of the on-site support personnel (e.g., for tracking purposes, the on-site support personnel may be located somewhere within the area). In certain embodiments, the area dimension may be controlled by settings, as described herein. Based on such determinations in 610, the location of the on-site support personnel may then be provided in 612. Such a location may provided as a general area, to obscure the precise location of the user, as described herein.

Figure 7:
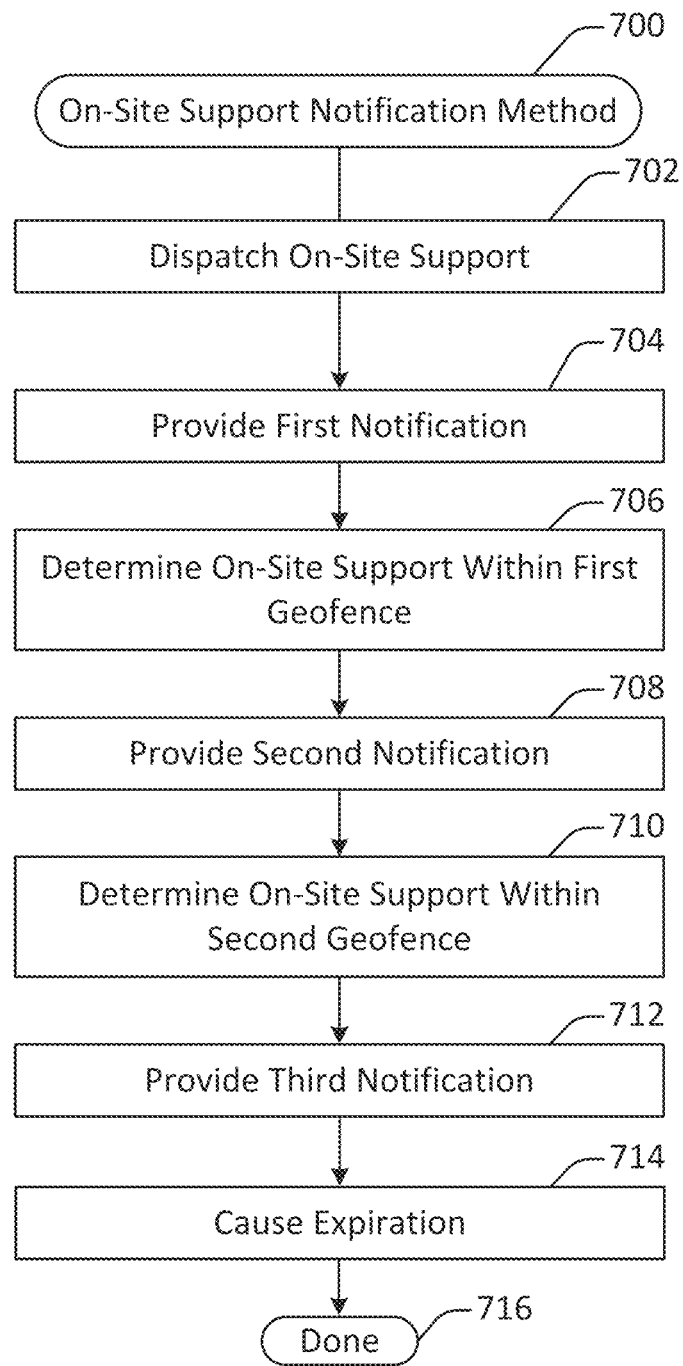
FIG. 7 illustrates an example technique of providing on-site support notifications, performed in accordance with one or more embodiments.

FIG. 7 illustrates an example technique of providing on-site support notifications, performed in accordance with one or more embodiments. FIG. 7 illustrates on-site support notification method 700. On-site support notification method 700 may be a technique for providing notifications to the customer based on the determined position of the on-site support personnel.

In 702, on-site support personnel is dispatched. Dispatching of on-site support personnel may be as described herein, similar to 304, 404, and/or 504. Based on the dispatching of the on-site support personnel, a first notification may be provided in 704. The notification may, for example, be a message provided to the customer indicating that on-site support personnel has been dispatched. The message may be provided via, for example, a SMS message, within an application, via a messaging program, through an e-mail, and/or through another such technique. As described herein, the message of 704 may be provided without the on-site support personnel being detected within a geofence.

In 706, location data from the service device may indicate that the service device is within a first geofence. The technique of 706 may be similar to that described herein. Based on the determination that the service device is within the first geofence, a second notification may be provided in 708. The second notification may include an update on the status of the on-site support personnel, an estimated time of arrival, a tracking link, and/or another update, as described herein.

In 710, a determination may be made from the location data of the service device that the service device is within a second geofence. Such a determination may be according to the techniques described herein. In response to determining that the service device is within the second geofence, a third notification may be provided in 712. The third notification may be, for example, a message indicating that the on-site support personnel has arrived at the specified location, a message indicating that arrival of the on-site support personnel is imminent, an update showing the location of the on-site support personnel, and/or another such message associated with the second geofence.

In 714, data may be received that the on-site support personnel has arrived at the specified location or that the on-site support personnel has performed the requested service. In response to receiving such data, one or more geofences and/or tracking links may expire. In certain embodiments, based on the location of the on-site support personnel relative to the geofences, the server device may automatically determine that the on-site support personnel has arrived at the specified location. Thus, in certain embodiments, after the on-site support personnel has been determined to have arrived inside the area of the second geofence, the geofences and/or tracking links may automatically expire.

Figure 8:
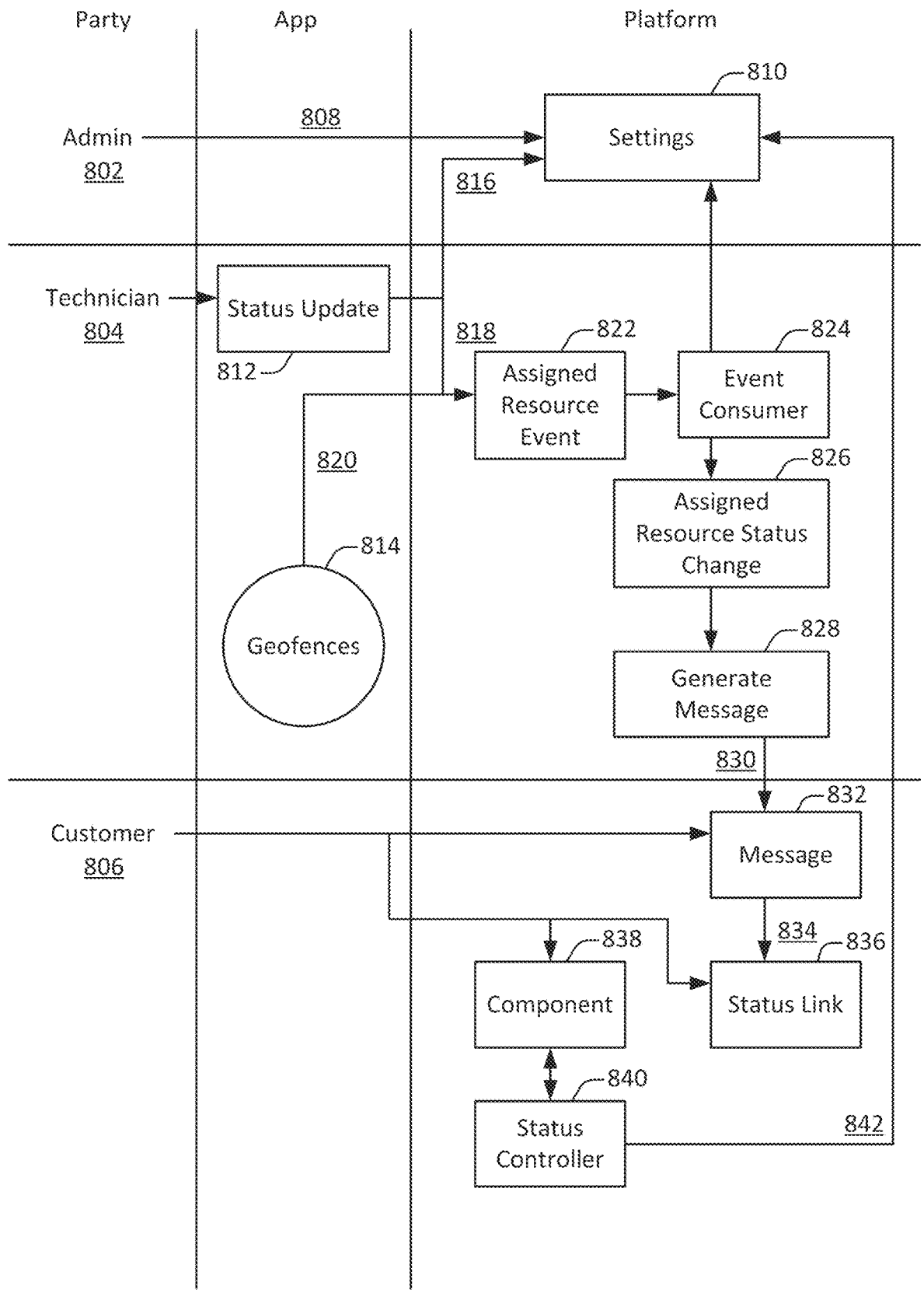
FIG. 8 illustrates an example technique of providing on-site support tracking between an administrator, a technician, and a user, performed in accordance with one or more embodiments.

FIG. 8 illustrates an example technique of providing on-site support personnel tracking between an administrator, a technician, and a user, performed in accordance with one or more embodiments. FIG. 8 illustrates a technique where various portions are performed by one or more applications (e.g., applications on customer or on-site support personnel devices) and a platform (e.g., system 100). The technique of FIG. 8 may include a plurality of parties, such as admin 802, technician 804, and customer 806.

Admin 802, in 808, provides the configurations of settings 810 to the platform. Settings 810 may be settings (e.g., set or default) governing the updates and tracking provided to customer 806 as well as other aspects of the technique. Settings 810 may create a webpage (e.g., provide a URL) or other link for tracking the location and/or status of technician 804. Settings 810 may also generate an encryption key. The encryption key may be associated with one or more messages provided to customer 806.

In 812, technician 804 (i.e., the on-site support personnel) may be dispatched and a status of technician 804 may be determined. Accordingly, technician 804 may change the status of the on-site support personnel to "en route" or another such status. As such, the status of technician 804 may be assigned a resource within the platform for the purposes of tracking the status of technician 804.

In certain embodiments, the status of technician 804 may be manually changed, but other embodiments may automatically change the status of technician 804 (e.g., based on the service device determining that technician 804 is moving and that customer 806 is next on technician 804's schedule). Geofences may also accordingly be created, based on the dispatching of technician 804.

Geofences may be preset configurations for configuring geofences relative to the specific location and/or the on-site support personnel, pre-determined geofences, and/or other data associated with configuration of geofences. One or more geofences may then accordingly be configured in 814.

In 820, a breach (e.g., by a service device) of one or more of the geofences may be determined. Thus, for example, the last known location of the service device may be checked against the locations of one or more geofences. If the last known location of the service device is within one or more of the geofences, the service device may be determined to have breached one or more of the geofences. In other embodiments, if a location of the service device was previously determined to outside the geofence, but is then determined to be inside the geofence, a breach of the geofence is accordingly determined.

Based off of the status update of 812 and the breach of one or more geofences of 820, settings 810 may be obtained in 816. Additionally, in 818, a determination is performed as to whether an event is invoked. The event may be, for example, a determination that the status of technician 804 has changed. Based on determining that the status has changed, assigned resource update event 822 may be provided to event consumer 824 to update the associated status of technician 804, as stored within the platform.

Based on assigned resource update event 822, event consumer 824 updates the location information of technician 804 (e.g., the longitude and latitude coordinates of technician 804). Event consumer 824 may additionally generate an update (e.g., a URL that provides the update) and/or a tracking link to be provided to customer 806.

Accordingly, in 826, the object status of technician 804 may be changed to reflect the change in real-life status of technician 804 (e.g., technician 804 breaching one or more geofences). The update and/or tracking link may accordingly be prepared to be communicated to customer 806. In certain embodiments, the update may be provided in a SMS, application message, on a webpage, and/or through another such technique. In certain embodiments where messages are communicated to customer 806 (e.g., via SMS), a token may be appended to the message. The token may be of an AES-256 encryption format. Accordingly, data provided to customer 806 may be encrypted and may be decrypted with, for example, the key of settings 810.

In 828, the message may be accordingly generated. In various embodiments, the message may of a format as described herein. The message may be communicated in 830 and received by customer 806 in 832.

In 834, the user may receive and open the message. Accordingly, for an embodiment utilizing SMS or online messaging, a read receipt may be provided. Based on opening the message in 834, status link 836 may provide a status update. The status update may be, for example, a webpage or message providing a status update and/or tracking of technician 804.

In various embodiments, the status update may be provided by, for example, a portal accessed through the message. The information provided through the portal may configured by admin 802. In certain embodiments, customer 806 may be associated with an account/profile. Admin 802 may configure the platform to provide information based on the account/profile. Accordingly, for example, each account/profile may be associated with a status/rank or may include marks denoting characteristics of the account number. The amount of information presented to customer 806 may be based on the status/rank or marks. Thus, certain customers may include marks indicating that they always require tracking and, accordingly, messages provided to such customers may always include tracking links, where feasible. Furthermore, in certain embodiments, tracking links or additional information may be considered as premium features and, thus, only available to customers with higher status/rank.

In certain embodiments, admin 802 may configure the amount of information presented to the customer based on the geofence that is breached. Accordingly, additionally information may be provided to the customer when technician 804 breaches geofences that are closer to the specified location or various different amounts of information may be provided based on the geofences breached.

Status link 836 may include component 838. In certain embodiments, component 838 may be, for example, a Lightning Web Component or another custom HTML component. Component 838 may cause status controller 840 to obtain key 842.

Key 842 may be utilized to decrypt the token. The decrypted information my provide information such as the current location of technician 804, as well as other information. Furthermore, in certain embodiments, the status of the appointment may be checked to see if, for example, the appointment has been canceled. If such a status is changed, the status update may include the status change. Additionally, the decrypted information may include the remaining time for the status update. Key 842 may be auto-generated and auto refreshed whenever any of settings of the platform changes (e.g., based on schedule or on input from admin 802). Keys 842 may be specific to the admin. Thus, in the configuration of system 200, the service providers may not share keys.

In various embodiments, the message may be encrypted (e.g., via the token). The encrypted message may be decrypted by the platform and/or the customer device to determine. The decryption may, for example, provide a status update and/or allow for a determination of a current location of technician 804. Admin 802 may configure the information that is presented to customer 806, such as the level of tracking information provided. As such, the encrypted message provided to the customer device may then be required to be provided to the platform for decryption and such decryption may accordingly determine the level of information provided to the customer. Such encryption may provide for data security.

Additionally, data provided by technician 804, such as the location data of the service device, may also be encrypted. The platform may be configured to decrypt such data to determine the location of technician 804, but the encryption may provide for security against other parties obtaining the location data of technician 804. In certain embodiments, admin 802 may additionally configure extra parameters that are part of the message and such parameters may be encrypted.

Figure 9:
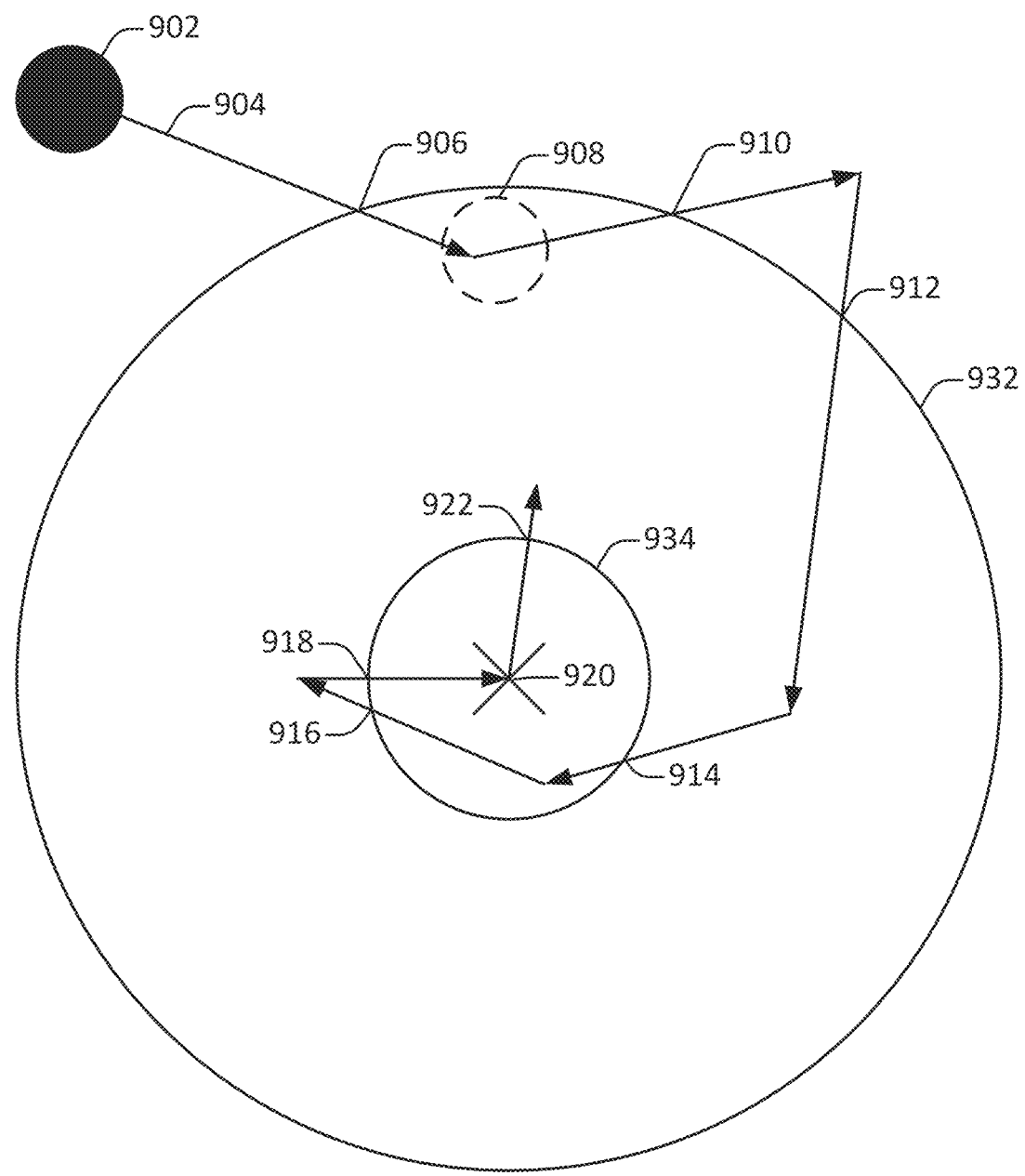
FIG. 9 illustrates an example of techniques performed during dispatch of on-site support, performed in accordance with one or more embodiments.

FIG. 9 illustrates an example of techniques performed during dispatch of on-site support, performed in accordance with one or more embodiments. Thus, FIG. 9 illustrates a sequence of movement of an on-site support personnel dispatched to a customer.

In 902, on-site support personnel is dispatched in response to a customer request. One or more geofences may also be erected in response to the dispatching of on-site support personnel (e.g., before, when, or after the on-site support personnel has been confirmed to be on their way to the customer). The geofences may be associated with the providing updates to the customer and/or for providing tracking, as described herein. The example of FIG. 9 may erect first geofence 932 and second geofence 934. The on-site support personnel may be dispatched to location 920, which may be the location specified by the customer for providing on-site support. It is appreciated that, in certain embodiments, dispatching of on-site support personnel at 902 may result in communications being provided to the customer indicating the dispatching of the on-site support personnel.

In 904, the on-site support personnel may travel along a portion of the route that is outside of geofences 932 and 934. Accordingly, during travel along this section, no update is provided to the customer. In 906, the on-site support personnel may be determined to have entered (e.g., breached) first geofence 932. Entry of on-site support personnel within geofence 932 may accordingly trigger actions by the platform.

For example, as on-site support personnel is determined to have breached geofence 932, an update (e.g., indicating that the on-site support personnel is close or within a pre-determined period of time away) and/or tracking link may be provided to the customer, accordingly to the techniques described herein. Additionally or alternatively, the platform may note (e.g., through writing in one or more entries within a database) that the on-site support personnel has breached geofence 932 or may tear down geofence 932. Such a technique may prevent duplicate updates and/or tracking links from being provided to the customer. For example, in 910, the on-site support personnel may be determined to have exited the area of geofence 932 and, in 912, the on-site support personnel may be determined to have again entered geofence 932. However, as the initial entry of the on-site support personnel into geofence 932 is accordingly noted and/or geofence 932 is torn down, a duplicate update or tracking link is not provided to the customer.

While within geofence 932 and/or 934, the location of the on-site support personnel may be tracked. In certain embodiments, the location of the on-site support personnel may be obscured within the support personnel's own personal geofence. For example, while the on-site support personnel's location is trackable, it may be obscured within the area of geofence 908. The location of the on-site support personnel may be somewhere within geofence 908. In various embodiments, randomization may be utilized so that the location of the on-site support personnel is not generally located within the middle of geofence 908. Such a technical may be always utilized for tracking the on-site support personnel or may be utilized under certain conditions (e.g., based on a privacy setting by the support provider and/or the on-site support personnel).

In 914, the on-site support personnel may be determined to have entered (e.g., breached) second geofence 934. In certain embodiments, entry of on-site support personnel within geofence 934 may accordingly trigger actions by the platform, as described herein. In certain embodiments, geofence 934 may be a geofence associated with imminent arrival of the on-site support personnel to location 920. Accordingly, as described herein, entry of the on-site support personnel within geofence 934 may cause a message indicating imminent arrival of the on-site support personnel to be provided to the customer. Additionally, as described herein, further tracking and/or other information (e.g., an option to directly contact the on-site support personnel) may be provided.

In certain embodiments, the platform may note (e.g., through writing in one or more entries within a database) that the on-site support personnel has breached geofence 934 or may tear down geofence 934. Such a technique allows for the on-site support personnel to exit geofence 934 in 916 and re-enter geofence 934 in 918 without triggering additional updates or other actions.

The on-site support personnel may then arrive at location 920. Arrival of the on-site support personnel at location 920 may be detected and may indicate that on-site support personnel has arrived and is now performing the requested service. In certain embodiments, the status of the on-site support personnel may be accordingly updated. Once movement of the on-site support personnel is detected again, the platform may then determine that the requested service has been performed. Alternatively or additionally, feedback may also be received from the on-site support personnel and/or the customer indicating that service has been finished. Such feedback may also or alternatively allow for a determination that the service has been completed.

In certain embodiments, once the on-site support personnel has moved a threshold distance, tracking and/or providing of data associated with the service may cease and, for example, any tracking links provided to the customer may expire. Thus, for example, tracking link data stored within a database may be deleted. Accordingly, when the on-site support personnel is at 922, such tracking and/or providing of data may cease. In certain embodiments, 922 may be associated with the on-site support personnel exiting geofence 934 (e.g., for embodiments where geofence 934 is not yet torn down), but in other embodiments, 922 may correspond to the on-site support personnel moving a threshold distance away from location 920.

Figure 10:
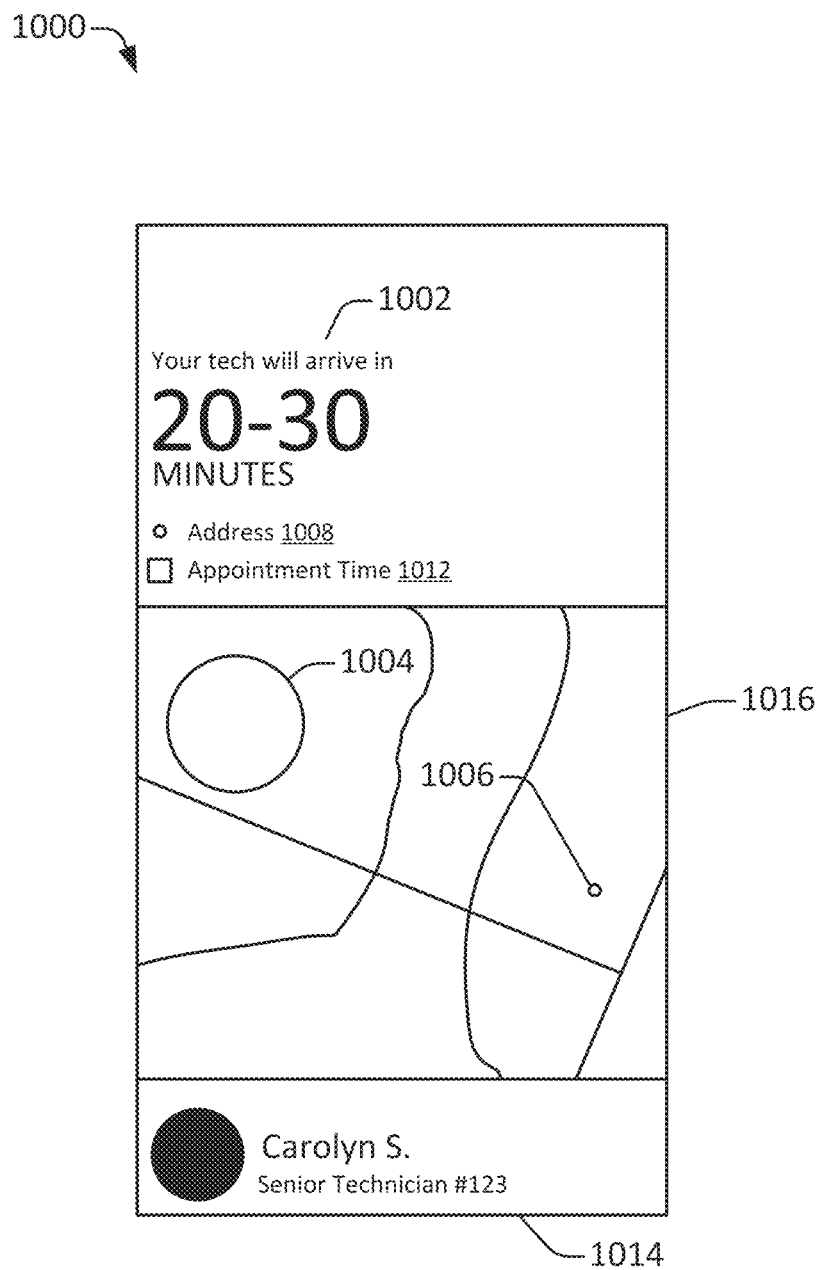
FIG. 10 illustrates an example graphical user interface for tracking on-site support, configured in accordance with one or more embodiments.

FIG. 10 illustrates an example graphical user interface for tracking on-site support, configured in accordance with one or more embodiments. FIG. 10 illustrates graphical user interface (GUI) 1000. GUI 1000 includes arrival information 1002, address 1008, appointment time 1012, technician information 1014, and map 1016.

Arrival information 1002 may include an estimated time of arrival of the on-site support personnel. Address 1008 may indicate the specified location where the on-site support personnel is requested to arrive at. Appointment time 1012 may indicate the time that the on-site support personnel is promised or requested to arrive. Technician information 1014 may include the name and/or other information (e.g., photo, ID number) of the dispatched on-site support personnel.

Map 1016 may be a map where the location of the on-site support personnel may be tracked. Tracking zone 1004 may be an area that includes the current location of the on-site support personnel. Tracking zone 1004 allows for the precise location of the on-site support personnel to be obscured and may be, for example, a randomized bubble around the location of the on-site support personnel. Location 1006 may be the specification location. Thus, map 1016 allows for a visualization of the distance of how far away the on-site support personnel is from location 1006.

Figure 11:
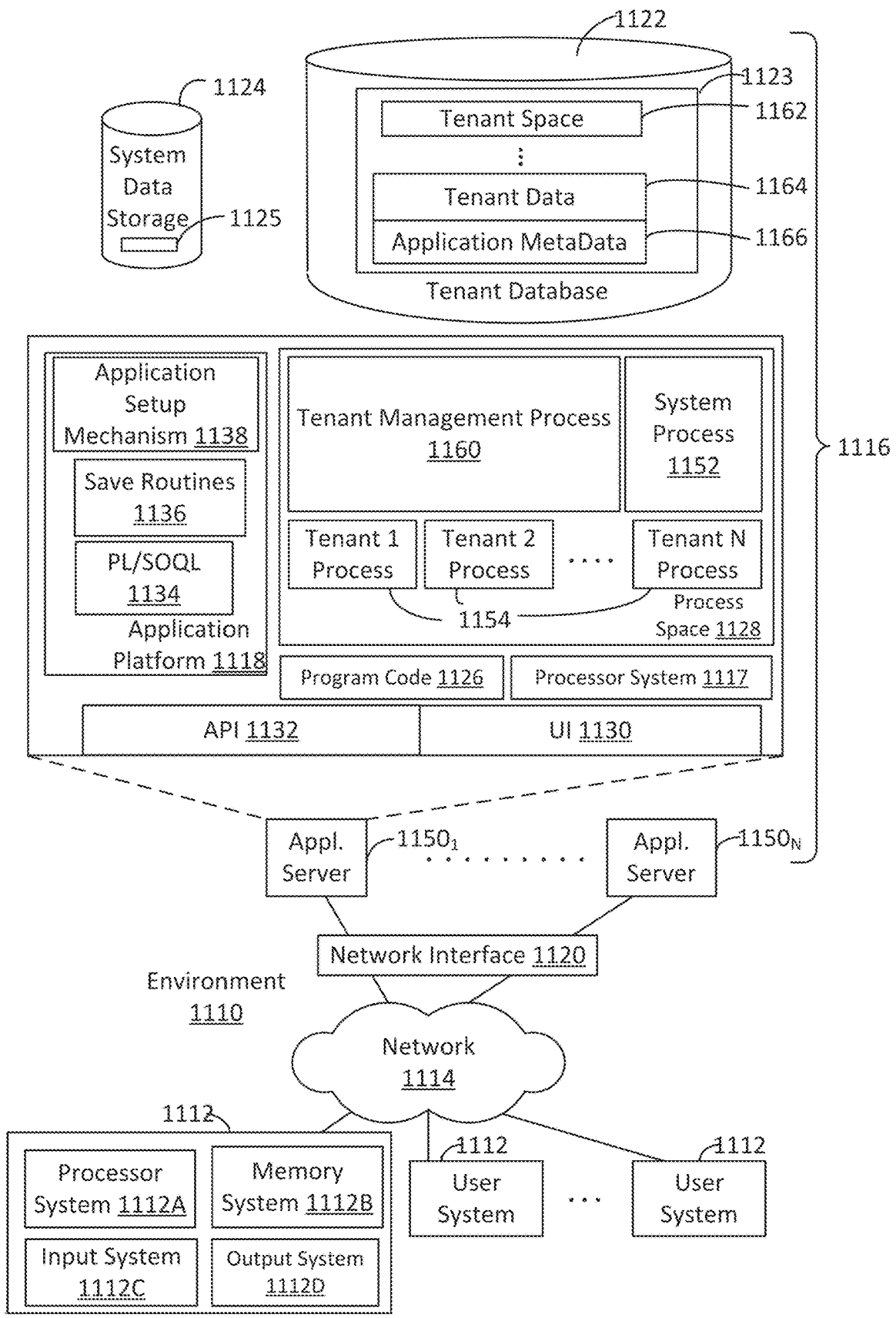
FIG. 11 shows a block diagram of an example of an environment that includes an on-demand database service, configured in accordance with some implementations.

FIG. 11 shows a block diagram of an example of an environment 1110 that includes an on-demand database service configured in accordance with some implementations. Environment 1110 may include user systems 1112, network 1114, database system 1116, processor system 1117, application platform 1118, network interface 1120, tenant data storage 1122, tenant data 1123, system data storage 1124, system data 1125, program code 1126, process space 1128, User Interface (UI) 1130, Application Program Interface (API) 1132, PL/SOQL 1134, save routines 1136, application setup mechanism 1138, application servers 1150-1 through 1150-N, system process space 1152, tenant process spaces 1154, tenant management process space 1160, tenant storage space 1162, user storage 1164, and application metadata 1166. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1116, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1118 may be a framework that allows the creation, management, and execution of applications in system 1116. Such applications may be developed by the database service provider or by users or third-party application developers accessing the service. Application platform 1118 includes an application setup mechanism 1138 that supports application developers' creation and management of applications, which may be saved as metadata into tenant data storage 1122 by save routines 1136 for execution by subscribers as one or more tenant process spaces 1154 managed by tenant management process 1160 for example. Invocations to such applications may be coded using PL/SOQL 1134 that provides a programming language style interface extension to API 1132. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1166 for a subscriber making such an invocation. Such system processes may also manage execution of application metadata 1166 as an application in a virtual machine.

In some implementations, each application server 1150 may handle requests for any user associated with any organization. A load balancing function (e.g., an F5 Big-IP load balancer) may distribute requests to the application servers 1150 based on an algorithm such as least-connections, round robin, observed response time, etc. Each application server 1150 may be configured to communicate with tenant data storage 1122 and the tenant data 1123 therein, and system data storage 1124 and the system data 1125 therein to serve requests of user systems 1112. The tenant data 1123 may be divided into individual tenant storage spaces 1162, which can be either a physical arrangement and/or a logical arrangement of data. Within each tenant storage space 1162, user storage 1164 and application metadata 1166 may be similarly allocated for each user. For example, a copy of a user's most recently used (MRU) items might be stored to user storage 1164. Similarly, a copy of MRU items for an entire tenant organization may be stored to tenant storage space 1162. A UI 1130 provides a user interface and an API 1132 provides an application programming interface to system 1116 resident processes to users and/or developers at user systems 1112.

System 1116 may implement a web-based on-site support personnel tracking system. For example, in some implementations, system 1116 may include application servers configured to implement and execute on-site support personnel tracking software applications. The application servers may be configured to provide related data, code, forms, web pages and other information to and from user systems 1112. Additionally, the application servers may be configured to store information to, and retrieve information from a database system. Such information may include related data, objects, and/or Webpage content. With a multi-tenant system, data for multiple tenants may be stored in the same physical database object in tenant data storage 1122, however, tenant data may be arranged in the storage medium(s) of tenant data storage 1122 so that data of one tenant is kept logically separate from that of other tenants. In such a scheme, one tenant may not access another tenant's data, unless such data is expressly shared.

Several elements in the system shown in FIG. 11 include conventional, well-known elements that are explained only briefly here. For example, user system 1112 may include processor system 1112A, memory system 1112B, input system 1112C, and output system 1112D. A user system 1112 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1112 to access, process and view information, pages and applications available from system 1116 over network 1114.

Network 1114 may be any network or combination of networks of devices that communicate with one another, such as any one or any combination of a LAN (local area network), WAN (wide area network), wireless network, or other appropriate configuration.

The users of user systems 1112 may differ in their respective capacities, and the capacity of a particular user system 1112 to access information may be determined at least in part by "permissions" of the particular user system 1112. As discussed herein, permissions generally govern access to computing resources such as data objects, components, and other entities of a computing system, such as a on-site support personnel tracking system, a social networking system, and/or a CRM database system. "Permission sets" generally refer to groups of permissions that may be assigned to users of such a computing environment. For instance, the assignments of users and permission sets may be stored in one or more databases of System 1116. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1116 may provide on-demand database service to user systems 1112 using an MTS arrangement. By way of example, one tenant organization may be a company that employs a sales force where each salesperson uses system 1116 to manage their sales process. Thus, a user in such an organization may maintain contact data, leads data, customer follow-up data, performance data, goals and progress data, etc., all applicable to that user's personal sales process (e.g., in tenant data storage 1122). In this arrangement, a user may manage his or her sales efforts and cycles from a variety of devices, since relevant data and applications to interact with (e.g., access, view, modify, report, transmit, calculate, etc.) such data may be maintained and accessed by any user system 1112 having network access.

When implemented in an MTS arrangement, system 1116 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1116 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1116 may also maintain system-level data usable by multiple tenants or other data. Such system-level data may include industry reports, news, postings, and the like that are sharable between tenant organizations.

In some implementations, user systems 1112 may be client systems communicating with application servers 1150 to request and update system-level and tenant-level data from system 1116. By way of example, user systems 1112 may send one or more queries requesting data of a database maintained in tenant data storage 1122 and/or system data storage 1124. An application server 1150 of system 1116 may automatically generate one or more SQL statements (e.g., one or more SQL queries) that are designed to access the requested data. System data storage 1124 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 12A:
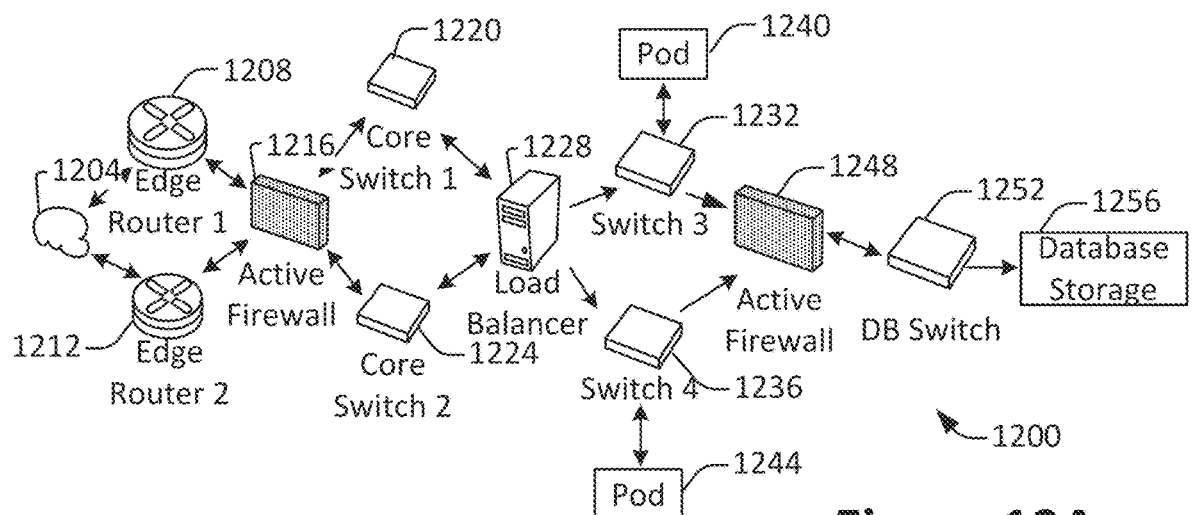
FIGS. 12A and 12B illustrate examples of a computing system, configured in accordance with one or more embodiments.

FIG. 12A shows a system diagram of an example of architectural components of an on-demand database service environment 1200, configured in accordance with some implementations. A client machine located in the cloud 1204 may communicate with the on-demand database service environment via one or more edge routers 1208 and 1212. A client machine may include any of the examples of user systems 1112 described above. The edge routers 1208 and 1212 may communicate with one or more core switches 1220 and 1224 via firewall 1216. The core switches may communicate with a load balancer 1228, which may distribute server load over different pods, such as the pods 1240 and 1244 by communication via pod switches 1232 and 1236. The pods 1240 and 1244, which may each include one or more servers and/or other computing resources, may perform data processing and other operations used to provide on-demand services. Components of the environment may communicate with a database storage 1256 via a database firewall 1248 and a database switch 1252.

Accessing an on-demand database service environment may involve communications transmitted among a variety of different components. The environment 1200 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 12A and 12B.

The cloud 1204 refers to any suitable data network or combination of data networks, which may include the Internet. Client machines located in the cloud 1204 may communicate with the on-demand database service environment 1200 to access services provided by the on-demand database service environment 1200. By way of example, client machines may access the on-demand database service environment 1200 to retrieve, store, edit, and/or process on-site support personnel tracking information.

In some implementations, the edge routers 1208 and 1212 route packets between the cloud 1204 and other components of the on-demand database service environment 1200. The edge routers 1208 and 1212 may employ the Border Gateway Protocol (BGP). The edge routers 1208 and 1212 may maintain a table of IP networks or 'prefixes', which designate network reachability among autonomous systems on the internet.

In one or more implementations, the firewall 1216 may protect the inner components of the environment 1200 from internet traffic. The firewall 1216 may block, permit, or deny access to the inner components of the on-demand database service environment 1200 based upon a set of rules and/or other criteria. The firewall 1216 may act as one or more of a packet filter, an application gateway, a stateful filter, a proxy server, or any other type of firewall.

In some implementations, the core switches 1220 and 1224 may be high-capacity switches that transfer packets within the environment 1200. The core switches 1220 and 1224 may be configured as network bridges that quickly route data between different components within the on-demand database service environment. The use of two or more core switches 1220 and 1224 may provide redundancy and/or reduced latency.

In some implementations, communication between the pods 1240 and 1244 may be conducted via the pod switches 1232 and 1236. The pod switches 1232 and 1236 may facilitate communication between the pods 1240 and 1244 and client machines, for example via core switches 1220 and 1224. Also or alternatively, the pod switches 1232 and 1236 may facilitate communication between the pods 1240 and 1244 and the database storage 1256. The load balancer 1228 may distribute workload between the pods, which may assist in improving the use of resources, increasing throughput, reducing response times, and/or reducing overhead. The load balancer 1228 may include multilayer switches to analyze and forward traffic.

In some implementations, access to the database storage 1256 may be guarded by a database firewall 1248, which may act as a computer application firewall operating at the database application layer of a protocol stack. The database firewall 1248 may protect the database storage 1256 from application attacks such as structure query language (SQL) injection, database rootkits, and unauthorized information disclosure. The database firewall 1248 may include a host using one or more forms of reverse proxy services to proxy traffic before passing it to a gateway router and/or may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some implementations, the database storage 1256 may be an on-demand database system shared by many different organizations. The on-demand database service may employ a single-tenant approach, a multi-tenant approach, a virtualized approach, or any other type of database approach. Communication with the database storage 1256 may be conducted via the database switch 1252. The database storage 1256 may include various software components for handling database queries. Accordingly, the database switch 1252 may direct database queries transmitted by other components of the environment (e.g., the pods 1240 and 1244) to the correct components within the database storage 1256.

Figure 12B:
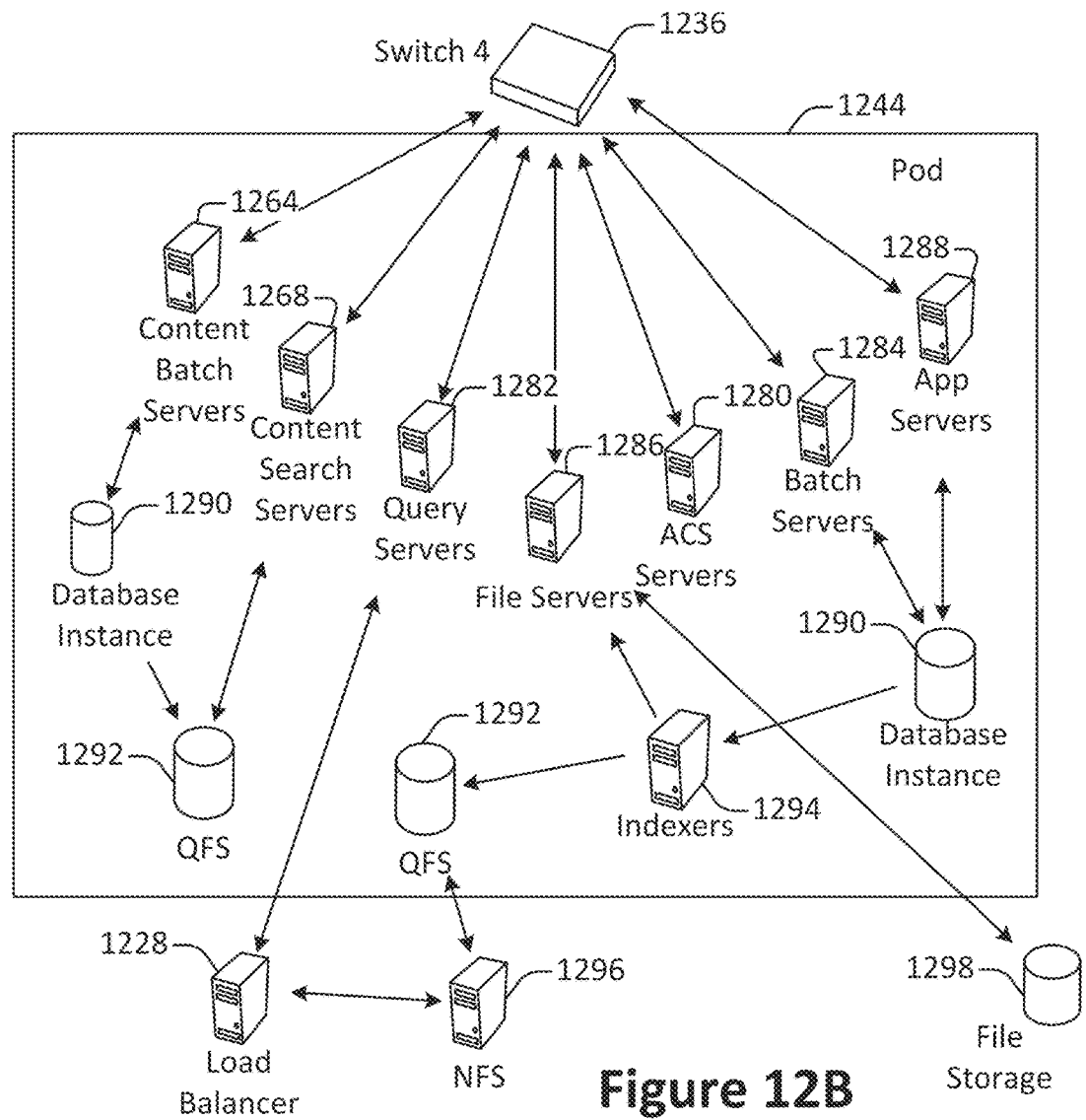

FIG. 12B shows a system diagram further illustrating an example of architectural components of an on-demand database service environment, in accordance with some implementations. The pod 1244 may be used to render services to user(s) of the on-demand database service environment 1200. The pod 1244 may include one or more content batch servers 1264, content search servers 1268, query servers 1282, file servers 1286, access control system (ACS) servers 1280, batch servers 1284, and app servers 1288. Also, the pod 1244 may include database instances 1290, quick file systems (QFS) 1292, and indexers 1294. Some or all communication between the servers in the pod 1244 may be transmitted via the switch 1236.

In some implementations, the app servers 1288 may include a framework dedicated to the execution of procedures (e.g., programs, routines, scripts) for supporting the construction of applications provided by the on-demand database service environment 1200 via the pod 1244. One or more instances of the app server 1288 may be configured to execute all or a portion of the operations of the services described herein.

In some implementations, as discussed above, the pod 1244 may include one or more database instances 1290. A database instance 1290 may be configured as an MTS in which different organizations share access to the same database, using the techniques described above. Database information may be transmitted to the indexer 1294, which may provide an index of information available in the database 1290 to file servers 1286. The QFS 1292 or other suitable filesystem may serve as a rapid-access file system for storing and accessing information available within the pod 1244. The QFS 1292 may support volume management capabilities, allowing many disks to be grouped together into a file system. The QFS 1292 may communicate with the database instances 1290, content search servers 1268 and/or indexers 1294 to identify, retrieve, move, and/or update data stored in the network file systems (NFS) 1296 and/or other storage systems.

In some implementations, one or more query servers 1282 may communicate with the NFS 1296 to retrieve and/or update information stored outside of the pod 1244. The NFS 1296 may allow servers located in the pod 1244 to access information over a network in a manner similar to how local storage is accessed. Queries from the query servers 1222 may be transmitted to the NFS 1296 via the load balancer 1228, which may distribute resource requests over various resources available in the on-demand database service environment 1200. The NFS 1296 may also communicate with the QFS 1292 to update the information stored on the NFS 1296 and/or to provide information to the QFS 1292 for use by servers located within the pod 1244.

In some implementations, the content batch servers 1264 may handle requests internal to the pod 1244. These requests may be long-running and/or not tied to a particular customer, such as requests related to log mining, cleanup work, and maintenance tasks. The content search servers 1268 may provide query and indexer functions such as functions allowing users to search through content stored in the on-demand database service environment 1200. The file servers 1286 may manage requests for information stored in the file storage 1298, which may store information such as documents, images, basic large objects (BLOBs), etc. The query servers 1282 may be used to retrieve information from one or more file systems. For example, the query system 1282 may receive requests for information from the app servers 1288 and then transmit information queries to the NFS 1296 located outside the pod 1244. The ACS servers 1280 may control access to data, hardware resources, or software resources called upon to render services provided by the pod 1244. The batch servers 1284 may process batch jobs, which are used to run tasks at specified times. Thus, the batch servers 1284 may transmit instructions to other servers, such as the app servers 1288, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 13:
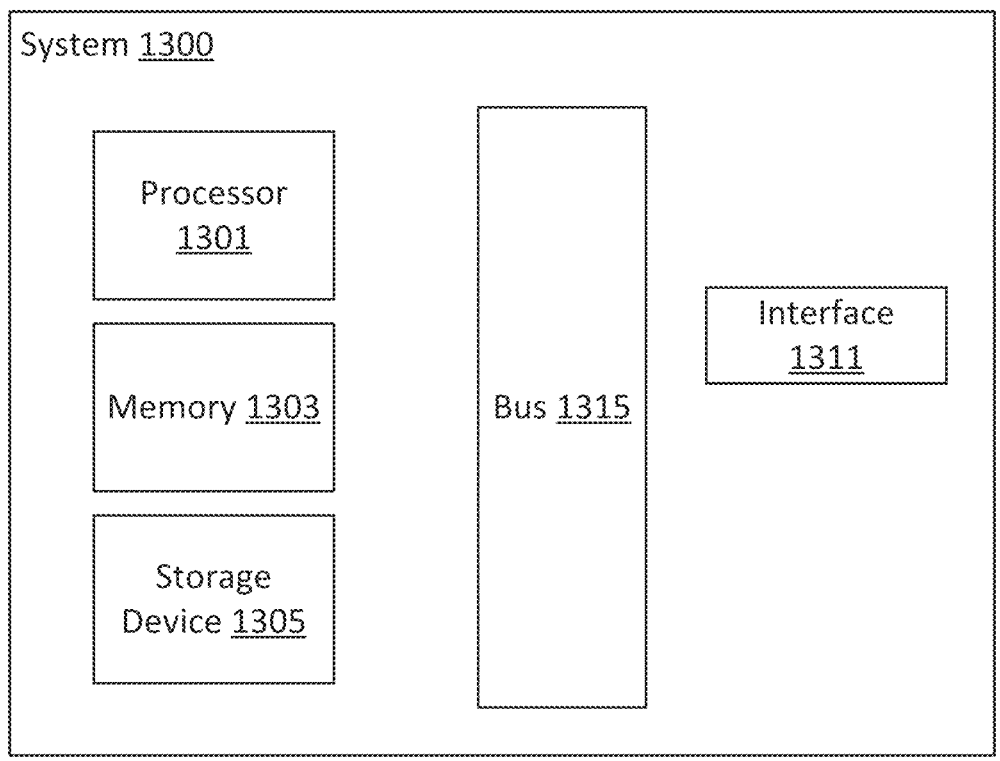
FIG. 13 illustrates an example of a computing device, configured in accordance with one or more embodiments.

FIG. 13 illustrates one example of a computing device. According to various embodiments, a system 1300 suitable for implementing embodiments described herein includes a processor 1301, a memory module 1303, a storage device 1305, an interface 1311, and a bus 1315 (e.g., a PCI bus or other interconnection fabric.) System 1300 may operate as variety of devices such as an application server, a database server, or any other device or service described herein. Although a particular configuration is described, a variety of alternative configurations are possible. The processor 1301 may perform operations such as those described herein. Instructions for performing such operations may be embodied in the memory 1303, on one or more non-transitory computer readable media, or on some other storage device. Various specially configured devices can also be used in place of or in addition to the processor 1301. The interface 1311 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A system comprising:
 a support database associated with a service vendor, the support database configured to store vendor data associated with the service vendor;
 a service database associated with a service technician associated with the service vendor, the service database configured to store personnel data associated with the service technician; and
 a processor, communicatively coupled to the database and configured to perform operations comprising:
  determining, from location data provided by a service device associated with the service technician, that the service technician has been dispatched to a first location of a first user, wherein the first user is a customer requesting service from the service vendor;
  creating a first geofence and a second geofence, wherein the first geofence and the second geofence are stored within the support database, and wherein the second geofence is within the first geofence;
  determining, from the location data, that the service device is within the first geofence;
  providing a tracking link to a first user device of the first user, wherein the tracking link is configured to provide a location of the service technician within a first area based on settings indicated by the personnel data stored within the service database;
  determining, from the location data, that the service device is within the first geofence and the second geofence;
  in response to the determining that the service device is within the first geofence and the second geofence, deleting the first geofence; and
  providing an on-site notification to the first user device.

2. The system of claim 1, wherein at least the first geofence and/or the second geofence is created based on a distance and/or estimated time of travel to the first location of the first user.

3. The system of claim 1, wherein the service technician is located within the first area.

4. The system of claim 3, wherein the first area comprises an area with a minimum radius of at least 500 feet.

5. The system of claim 3, wherein the personnel data indicates dimensions of the first area.

6. The system of claim 1, wherein the operations further comprise:
 receiving, from the service device, task data indicating that the requested service has been performed;
 providing a support completion message to the first user device; and
 in response to the determining that the requested service has been performed, deleting the second geofence.

7. The system of claim 1, wherein the operations further comprise:
 in response to determining that the service technician has been dispatched to the first user, providing dispatch data to the first user device configured to cause the first user device to provide a dispatch update.

8. A method performed by a processor, the method comprising:
 determining, from location data provided by a service device associated with a service technician, that the service technician has been dispatched to a first location of a first user, wherein the first user is a customer requesting service from a service vendor;
 creating a first geofence and a second geofence;
 storing the first geofence and the second geofence within a support database associated with a service vendor, the support database configured to store vendor data associated with the service vendor;
 determining, from the location data, that the service device is within the first geofence;
 providing a tracking link to a first user device of the first user, wherein the tracking link is configured to provide a location of the service technician within a first area based on settings indicated by personnel data stored within a service database associated with the service technician associated with the service vendor, the service database configured to store personnel data associated with the service technician;
 determining, from the location data, that the service device is within the first geofence and the second geofence;
 in response to the determining that the service device is within the first geofence and the second geofence, deleting the first geofence; and
 providing an on-site notification to the first user device.

9. The method of claim 8, wherein at least the first geofence and/or the second geofence is created based on a distance and/or estimated time of travel to the first location of the first user.

10. The method of claim 8, wherein the service technician is located within the first area.

11. The method of claim 10, wherein the first area comprises an area with a minimum radius of at least 500 feet.

12. The method of claim 10,
 wherein the personnel data indicates dimensions of the first area.

13. The method of claim 8, further comprising:
 receiving, from the service device, task data indicating that the requested service has been performed;
 providing a support completion message to the first user device; and in response to the determining that the requested service has been performed, deleting the second geofence.

14. The method of claim 8, further comprising:
in response to determining that the service technician has been dispatched to the first user, providing dispatch data to the first user device configured to cause the first user device to provide a dispatch update.

15. A computer program product comprising a non-transitory computer-readable medium comprising program code capable of being executed by one or more processors, the program code comprising instructions configurable to cause, when executed by the one or more processors, operations comprising:
determining, from location data provided by a service device associated with a service technician, that the service technician has been dispatched to a first location of a first user, wherein the first user is a customer requesting service from a service vendor;
creating a first geofence and a second geofence;
storing the first geofence and the second geofence within a support database associated with a service vendor, the support database configured to store vendor data associated with the service vendor;
determining, from the location data, that the service device is within the first geofence;
providing a tracking link to a first user device of the first user, wherein the tracking link is configured to provide a location of the service technician within a first area based on settings indicated by personnel data stored within a service database associated with the service technician associated with the service vendor, the service database configured to store personnel data associated with the service technician;
determining, from the location data, that the service device is within the first geofence and the second geofence;
in response to the determining that the service device is within the first geofence and the second geofence, deleting the first geofence; and
providing an on-site notification to the first user device.

16. The computer program product of claim 15, wherein at least the first geofence and/or the second geofence is created based on a distance and/or estimated time of travel to the first location of the first user.

17. The computer program product of claim 15, wherein the service technician is located within the first area.

18. The computer program product of claim 17, wherein the first area comprises an area with a minimum radius of at least 500 feet.

19. The computer program product of claim 17, wherein the personnel data indicates dimensions of the first area.

20. The computer program product of claim 15, wherein the operations further comprise:
receiving, from the service device, task data indicating that the requested service has been performed;
providing a support completion message to the first user device; and
in response to the determining that the requested service has been performed, deleting the second geofence.

\* \* \* \* \*